Jan. 25, 1938.  R. W. CROSSEN, JR., ET AL  2,106,206
TANK VEHICLE
Filed Feb. 11, 1935  3 Sheets-Sheet 2
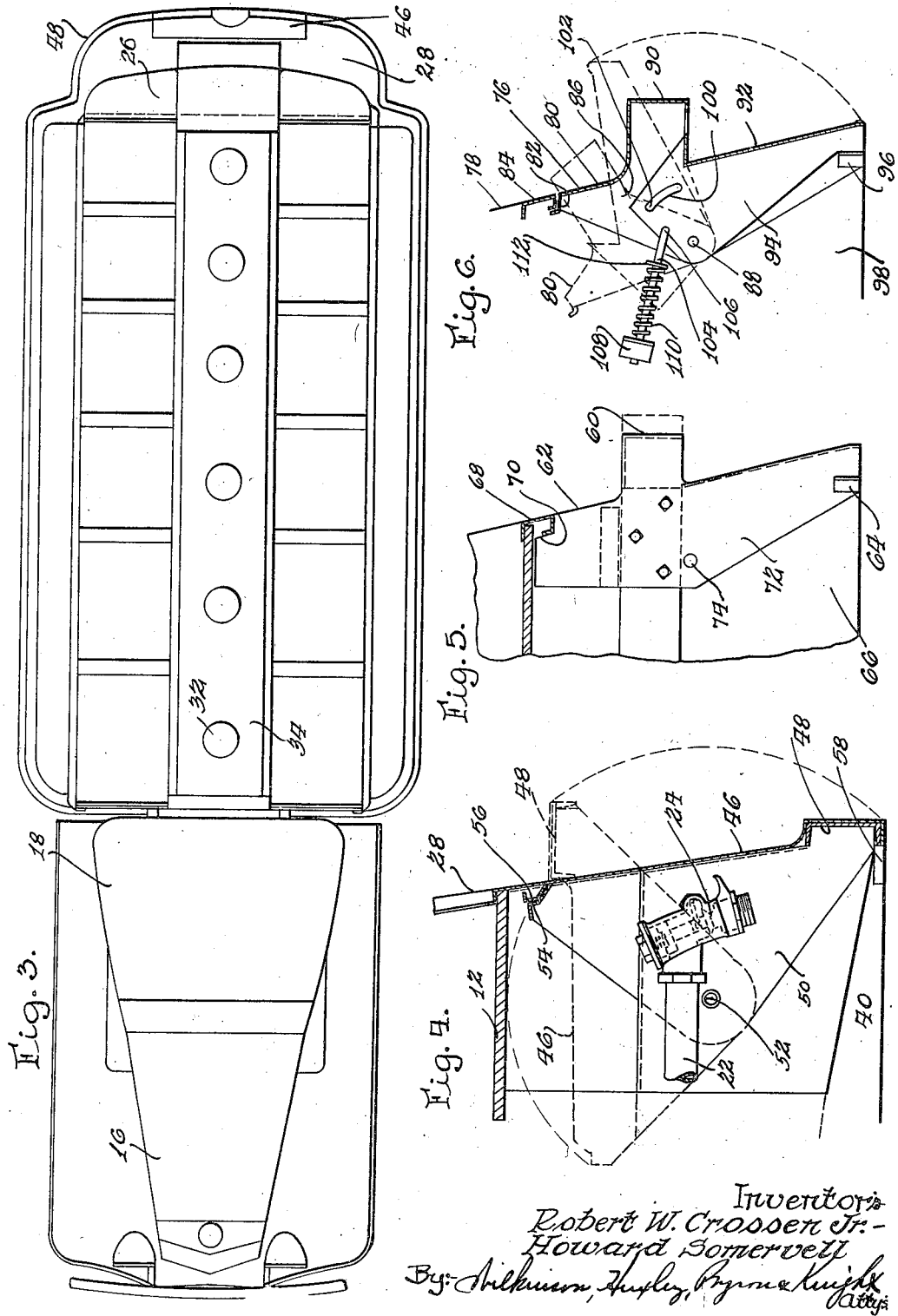

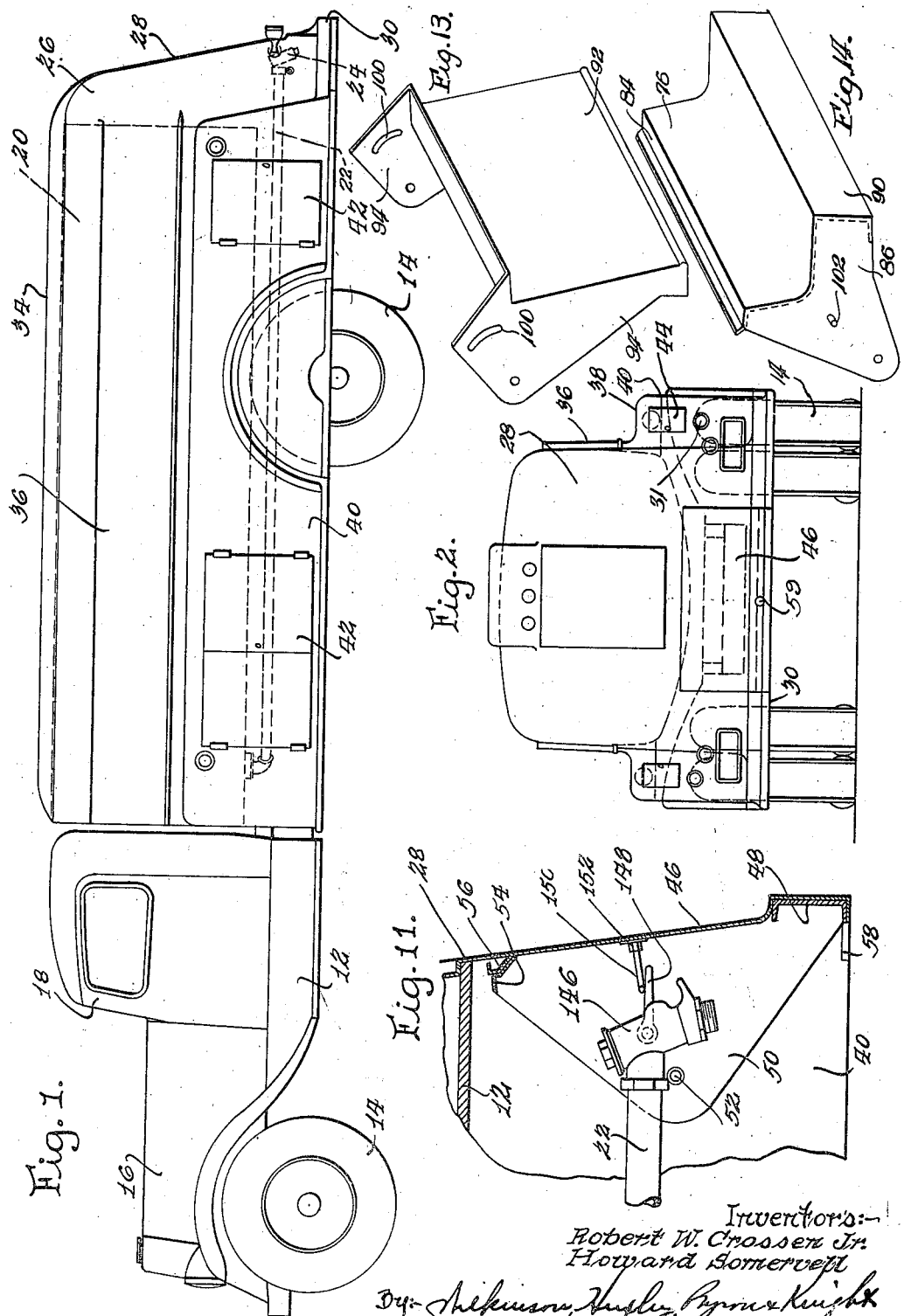

Jan. 25, 1938.  R. W. CROSSEN, JR., ET AL  2,106,206
TANK VEHICLE
Filed Feb. 11, 1935  3 Sheets-Sheet 3
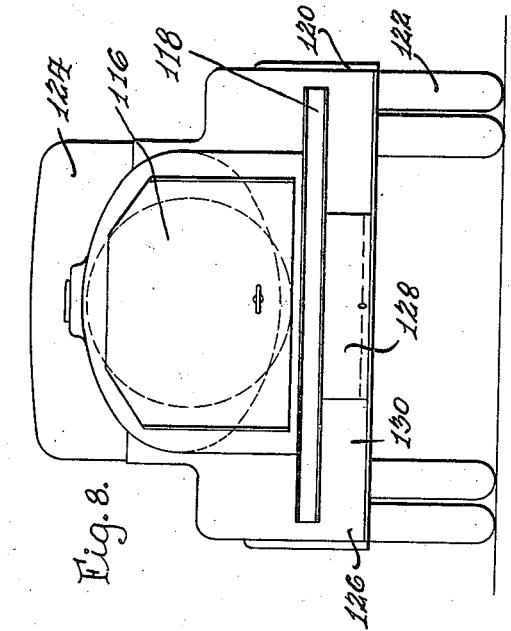
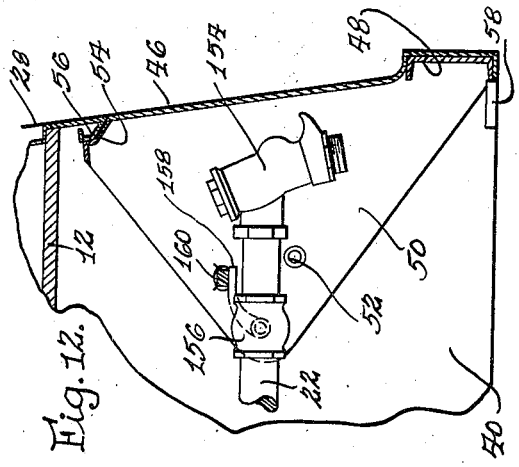
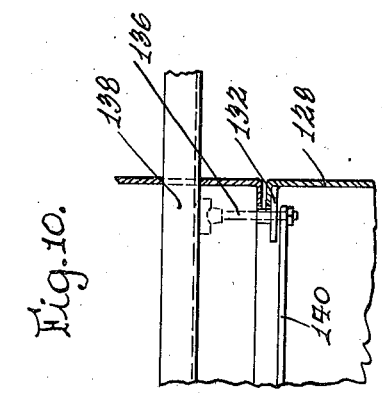
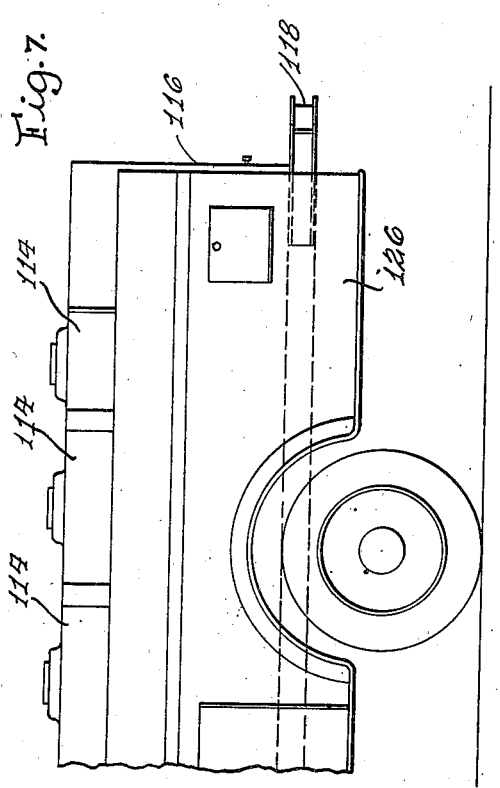
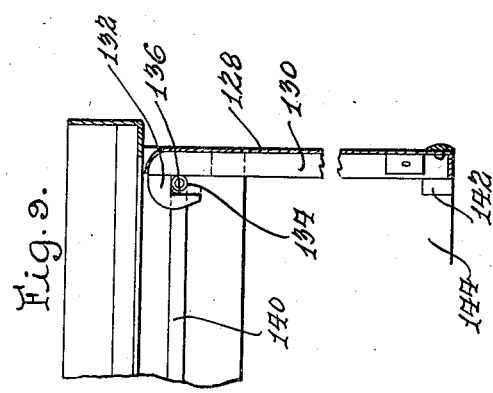
Inventors-
Robert W. Crossen, Jr.
Howard Somervell
By Wilkinson, Husley, Pyron & Knight
Attys.

Patented Jan. 25, 1938

2,106,206

UNITED STATES PATENT OFFICE 2,106,206

TANK VEHICLE

Robert W. Crossen, Jr., Plainfield, and Howard Somervell, Evanston, Ill., assignors to Farrell Manufacturing Company, Joliet, Ill., a corporation of Illinois Application February 11, 1935, Serial No. 6,030

17 Claims. (Cl. 280—5)

This invention pertains to tank vehicles, and more particularly to stream-line tank vehicles wherein movable panels are provided for permitting access to dispensing means provided on said vehicles.

In order to supply various gasoline stations, garages, and the like with liquid fuel and lubricants it is usual for oil companies and the like to use motor tank trucks having a tank provided on the chassis, which tank is sub-divided into a number of tanks adapted to carry different types of lubricant and fuel. These tanks are necessarily carried longitudinally of the vehicle, and dispensing means extending to the various tanks is provided at the after end of the tank so that the attendant may conveniently draw lubricant or fuel from the vehicle from a single point.

With the advent of the so-called stream-line vehicles, a casing may be placed around the longitudinal tank, and preferably should extend below the dispensing means so that substantially a smooth shell is presented to reduce wind friction. It is thus desirable to completely enclose the dispensing means, yet at the same time ready access must be had to the dispensing means as well as provision of a substantially uninterrupted bumper when the vehicle is in transit. The encasing means when in position should render the dispensing means inoperative, and likewise, when locked in place, prevents unauthorized access to the dispensing means.

It is therefore an object of the invention to provide a vehicle wherein a movable panel is provided for permitting and preventing access to the dispensing means therefrom.

Another object is to provide a panel which may be biased to different positions, and maintained in those positions, for permitting or preventing ready access to dispensing means from the vehicle.

Still another object of the invention is to provide a movable panel for a tank truck, the panel forming means for preventing discharge from the tank unless the panel is open.

A further object is to provide a tank vehicle having a movable panel to permit access to the dispensing means for the tank, which panel provides a continuation of the body bumper.

With these and various other objects in view, the invention may consist of certain novel features of construction and operation as will be more fully described and particularly pointed out in the specification, drawings and claims appended hereto.

In the drawings, which illustrate embodiments of the device and wherein like reference characters are used to designate like parts—

Figure 1 is a side elevation of one form of stream-line tank vehicle embodying the invention;

Figure 2 is an end elevation of the tank vehicle illustrated in Figure 1;

Figure 3 is a top plan view of the vehicle illustrated in Figure 1;

Figure 4 is an enlarged fragmentary sectional elevation through the movable panel of the tank vehicle illustrated in Figures 1, 2 and 3;

Figure 5 is an enlarged fragmentary sectional elevation corresponding to Figure 4 showing a modified form of movable panel;

Figure 6 is an enlarged fragmentary sectional elevation corresponding to Figure 4 showing another modified form of movable panel;

Figure 7 is a fragmentary end elevation through a tank vehicle showing a different form of tank and panel construction;

Figure 8 is an end elevation of the tank vehicle illustrated in Figure 7;

Figure 9 is an enlarged fragmentary sectional elevation taken through the movable panel of the tank vehicle illustrated in Figures 7 and 8;

Figure 10 is an enlarged fragmentary sectional plan view of the panel and associated tank vehicle structure illustrated in Figure 9;

Figures 11 and 12 are enlarged sectional elevations corresponding to Figure 4 showing forms of locking means provided for the dispensing means; and Figures 13 and 14 are isolated views in perspective of the panel members shown in Figure 6 of the drawings.

Referring first of all more particularly to the tank vehicle and panel construction illustrated in Figures 1 to 4 inclusive, and Figures 11 and 12, the vehicle consists essentially of the chassis 12 supported on the spaced wheels 14, the forward wheels shown as being the guiding wheels, and the source of power being illustrated at 16 disposed forward of the driver's cab 18. The longitudinally disposed tank 20 is disposed aft of the cab 18 and is divided into a number of tanks to carry lubricant or liquid fuel.

For the purposes of illustration, only one draw-off pipe 22 is shown extending from the forward tank to the rear of the vehicle, a draw-off valve 24 being shown (in Figure 4) as applied thereto. The form of tank vehicle illustrated is of the so-called stream-line type wherein the outer casing 26 surrounds the tank and extends from the cab to the rear end 28 of substantially the so-called beaver tail type, the end terminating in the lower bumper portion or body bumper member 30 extending from one side to the other of the vehicle above which are the stop lights 31. The casing 26 encloses the recessed fill openings of the tank illustrated generally in Figure 3 at 32, these being disposed below the upper walk 34 and being accessible through openings in the walk 34 which correspond substantially to openings 32. The side of the casing is provided with the panel 36 extending downwardly and merging into the cat walk 38, the side of the vehicle 40 under said walk being provided with the compartments indicated generally by the doors 42 and 44.

In order to provide access to the dispensing nozzle 24, a panel 46 is provided which is substantially a continuation of the end sheet or skirt 28, said panel merging into and enclosing the panel bumper member 48 disposed adjacent the lower edge of the panel 46. The panel is provided with the side sheets or members 50 which are hinged as at 52 to a portion of the under frame of the vehicle, and the upper part of each side sheet 50 is provided with the brace member 54 extending across the end panel 46 and adapted to abut the sill member 56 provided on the under frame of the vehicle in order to support the panel in lowered position. A stop 58 is also provided on the bumper 30 adjacent each side of the bumper member 48 adapted to abut said bumper member whereby the bumper member 48 forms a substantially continuous member with the bumper 30.

When it is desired to dispense liquid from the nozzle 24 a lock, indicated generally at 59 in Figure 2, may be unlatched and the panel raised to dotted line position as shown in Figure 4 where the bumper member 48 will abut the sill member 56, and either the member is weighted so that it will be maintained in raised position, or a spring such as to be described with respect to Figure 6 may be provided.

In the construction shown in Figure 5 a different form of end skirt is contemplated. In this case the bumper member 60 is disposed in the end panel 62 between the top of the panel and the lower point of said panel. As before, a stop 64 may be provided adjacent the lower point of the side panel 66 of the vehicle to provide a lower stop for the skirt. A sill member 68 is provided adjacent the upper portion of the panel and adapted to be engaged by a portion 70 provided on the side members 72 of the end panel. The side members are pivoted as at 74 to the vehicle under frame to permit the panel to be raised for access to the faucet (not shown). As before, a spring pressed member may be provided as contemplated in the modification illustrated in Figure 6, or the weight may be so distributed in the panel that it may be biased to open or closed position.

In the construction illustrated in Figure 6, the panel 76 disposed below the end sheet or skirt 78 is made in two parts. The upper part 80 is provided with the stop member 82 adapted to abut the sill member 84 for maintaining the upper member of the panel in proper closed position. The upper member is provided with the side members 86 pivoted to the vehicle under frame as at 88. The lower portion of the upper panel member is provided with the bumper 90 which forms a continuation of the side bumper members of the vehicle as contemplated in Figure 2. Suitable stop members may be provided where the bumper member 90 abuts the side bumper members. The lower panel portion 92 is provided with the side members 94 likewise hinged at 98. The end sheet of said lower panel portion 92 forms a substantially unbroken continuation of the plane of the upper member 76 and the end sheet 78.

The side members 94 are cut away and are adapted to abut the lower stop 96 provided on the lower part of the side panel 98 of the vehicle to maintain the lower panel member in proper lowered position. The side member 94 of the lower panel member is provided with an elongated slot 100 adapted to receive a pin 102 provided on the side member 86, and the side member 94 is provided with the plunger member 104 pivoted thereto as at 106 and extending through a suitable aperture provided in the guide 108 secured to the vehicle under frame. A compression spring 110 is interposed between the guide 108 and the seat 112 provided on the plunger 104.

Thus, when the panel is in lowered position the spring presses outwardly toward the seat 112 to maintain the panel members in lowered position, the pin 102 engaging in the upper portion of the slot 100. When it is desired to raise the members to permit access to the faucet (not shown) the lower member 92 is raised about the pivot 83, causing the pin 102 to move toward the lower portion of the slot 100 where it engages. Thus, continued movement of the lower member 92 will cause the upper panel member to be picked up and rotated about the pivot 88, compressing the spring until the spring is biased below the dead center of pivot 88, whereupon the lower members are released and will be maintained in position until they are closed and the upper panel member lowered about the pivot 88.

In the construction illustrated in Figures 7 to 10 inclusive, the tank vehicle is provided with the tanks 114 and the end compartment member 116. The bumper 118 extends across the chassis 120 which is supported on the wheels 122, the usual cab for the operator being illustrated at 124. As before, it is contemplated that the dispensing faucets are disposed to be encased in the casing 126, and to this end the casing 126 is provided with the panel 128 which normally forms a continuation of the end sheet or skirt 130 of the casing, being locked in position by any convenient means. The panel 128 is flanged at 139 and is provided with the open hinge 132 adapted to engage the roller 134 provided on the hinge 136, said hinge being suitably secured to the chassis or under frame 138.

A guide or supporting member 140 extends from the hinge substantially horizontally and for a distance preferably though not necessarily, greater than the length of the panel 128. The lower end of the panel is adapted to abut the stop 142 provided on the under carriage 144 of the vehicle. Thus, when it is desired to raise the panel to permit access to the dispensing faucets (not shown) the panel 128 may be raised about the hinge 136 to substantially a horizontal position, whereupon it may be slid inwardly to supported position on the member 140, which it is understood is provided adjacent each hinge 136, said hinges being provided on each side of the panel. Thus, the panel is supported in position to permit dispensing operation until it is desired to again lower the panel, where it may be locked into position to prevent unauthorized access to the dispensing means.

In the construction shown in Figure 11, the discharge pipe 22 is provided with the discharge nozzle 146 having the handle 148 for controlling said nozzle. The panel 46 is provided with the inwardly extending locking rod 150 secured thereto as at 152 and extending across said panel and adapted to engage each of the valve controlled handles 148 when the panel is in lowered position. Thus when the panel is lowered and locked it is impossible to raise the handles 148 to open the nozzle valve for dispensing operation from any of the tanks. Raising the panel about the pivot 52 will release the handles 148 so that they may be operated.

In some types of tank wagons the discharge nozzles are provided with removable handles. Thus in the form of device illustrated in Figure 12, the discharge pipe 22 is provided with the valved nozzle 154 which is provided with a removable handle (not shown) for operation thereof. In this form of device the pipe 22 is provided with the auxiliary valve 156 provided with the handle 158, the valve 156 or the handle 158 being provided with a spring normally urging the valve to open position. The side member 50 in this form of device is provided with the transverse rod 160 adapted to engage the handle 158 so that the handle will be moved to close the valve when the panel is in lowered position, so that when the panel is closed and/or locked in closed position, the valve 156 will be closed so that it will be impossible to operate the nozzle 154 when the panel is lowered. This also provides an automatic lock so that if the nozzle 154 is left open and the panel is inadvertently closed, flow will be automatically cut off. The handle of course may be manually moved so that the valve 156 will be kept open whereby dispensing operation with a closed panel may be effected. This of course would not be the normal operation.

Although the locks shown in Figures 11 and 12 are shown adapted for use with the type of panel shown in Figures 1 to 4 inclusive, it is of course understood they can be used with other forms of movable panels.

It is to be understood that we do not wish to be limited by the exact embodiments of the device shown, which are merely by way of illustration and not limitation, as various and other forms of the device will of course be apparent to those skilled in the art without departing from the spirit of the invention or the scope of the claims.

We claim:

1. In a tank vehicle, the combination of a chassis, a tank body supported on said chassis, dispensing means for said tank body, a skirt disposed adjacent said dispensing means for enclosing said means, said skirt being provided with a movable panel adapted to be moved to permit access to said dispensing means, said panel having a bumper thereon.

2. In a tank vehicle, the combination of a chassis, a tank body supported on said chassis, dispensing means for said tank body, a skirt disposed adjacent said dispensing means for enclosing said means, said skirt being provided with a panel pivoted with respect thereto and adapted to be moved to permit access to said dispensing means, said panel having a bumper thereon.

3. In a tank vehicle, the combination of a chassis, a tank body supported on said chassis, dispensing means for said tank body, a skirt disposed adjacent said dispensing means for enclosing said means, said skirt being provided with a means so constructed and arranged as to be moved to permit access to said dispensing means, said means having a bumper thereon.

4. In a tank vehicle, the combination of a chassis, a tank body supported on said chassis, dispensing means for said tank body, a skirt disposed adjacent said dispensing means for enclosing said means, said skirt being provided with a movable panel adapted to be moved to permit access to said dispensing means, said tank vehicle having a bumper, and bumping means provided on said panel forming a continuation of said bumper when said panel is in position to enclose said dispensing means.

5. In a tank vehicle, the combination of a chassis, a tank body supported on said chassis, dispensing means for said tank body, a skirt disposed adjacent said dispensing means for enclosing said means, said skirt being provided with a movable panel adapted to be moved to permit access to said dispensing means, a bumper formed in said skirt, and bumping means provided on said panel forming a continuation of said bumper when said panel is in position to enclose said dispensing means.

6. In a tank vehicle, the combination of a chassis, a tank body supported on said chassis, dispensing means for said tank body, a skirt disposed adjacent said dispensing means for enclosing said means, said skirt having a panel pivoted to said chassis, said panel comprising cooperating members forming a closure for said dispensing means, said members having means operable to effect simultaneous movement thereof and movement of one of said members alone, said members engaging stops when in closed position to form substantially an unbroken continuation of said skirt.

7. In a tank vehicle, the combination of a chassis, a tank body supported on said chassis and having dispensing means therefrom, a skirt disposed adjacent said dispensing means for enclosing said means, said skirt being provided with a panel provided with inwardly projecting side members pivoted to said chassis, a bumper member provided adjacent the lower edge of said panel, and bumper means formed on the lower edge of said skirt to form a continuation of said bumper member when said panel is in lowered position.

8. In a tank vehicle, the combination of a chassis, a tank body supported on said chassis, and having dispensing means therefrom, a skirt disposed adjacent said dispensing means for enclosing said means, said skirt being provided with a panel provided with inwardly projecting side members pivoted to said chassis, a bumper member provided on said panel intermediate and spaced from the upper and lower edges thereof, and bumper means provided on said skirt to form a continuation of said bumper member when said panel is in lowered position.

9. In a tank vehicle, the combination of a chassis, a tank body supported on said chassis, dispensing means for said tank body, a skirt disposed adjacent said dispensing means for enclosing said means, said skirt being provided with a panel formed in a plurality of parts and hinged to said chassis whereby said panel may be moved to permit access to said dispensing means, and means cooperating with one of said parts and adapted to be biased with respect to the axis of the hinge for maintaining said parts in selected position.

10. In a tank vehicle, the combination of a chassis, a tank body supported on said chassis, dispensing means for said tank body, a skirt disposed adjacent said dispensing means for enclosing said means, said skirt being provided with a panel formed in a plurality of parts one above the other and hinged to said chassis whereby said panel may be moved to permit access to said dispensing means, and a spring pressed member disposed between said chassis and the lower part of said panel for maintaining said parts in selected position.

11. In a tank vehicle, the combination of a chassis, a tank body supported on said chassis, dispensing means for said tank body, a skirt disposed adjacent said dispensing means for enclosing said means, said skirt being provided with a movable panel adapted to be moved to permit access to said dispensing means, said dispensing means having a discharge nozzle thereon, said nozzle having a handle disposed in fixed pivotal relation to said nozzle for operation thereof, said panel having means engageable with said handle for rendering said nozzle inoperative and preventing operation thereof when said panel is closed.

12. In a tank vehicle, the combination of a chassis, a tank body supported on said chassis, dispensing means for said tank body, a skirt disposed adjacent said dispensing means for enclosing said means, said skirt being provided with a movable panel adapted to be moved to permit access to said dispensing means, said dispensing means having a discharge nozzle thereon, a valve in said discharge line having a handle thereon normally urged to a valve open position, said panel having means thereon engageable with said handle for closing said valve when said panel is closed.

13. In a tank vehicle, the combination of a chassis, a tank body supported on said chassis, dispensing means for said tank body, a skirt disposed adjacent said dispensing means for enclosing said means, said skirt being provided with a movable panel adapted to be moved to permit access to said dispensing means, said dispensing means having a discharge nozzle thereon, a valve in said discharge line having a handle thereon normally urged to a valve open position, said panel having means engageable with said handle for rendering said nozzle inoperative when said panel is closed.

14. A movable panel including a plurality of members pivotally mounted on a common pivot, said members having means permitting a limited relative movement therebetween, and a resilient member connected to one of said members adapted to be biased with respect to said pivot to maintain said members in a predetermined position.

15. A movable panel including a plurality of members pivotally mounted on an adjacent support on a common pivot, said members having means permitting a limited relative movement therebetween, and a resilient member connected to one of said members and said adjacent support and adapted to be biased with respect to said pivot to urge said members toward a predetermined position.

16. In a tank vehicle, the combination of a chassis, a tank body including a tank supported on said chassis, said tank body being provided with an opening, dispensing means for said tank accessible through said opening, and a movable panel forming a part of said tank body for said opening for enclosing said means, said panel being provided with a bumper.

17. In a tank vehicle, the combination of a chassis, a tank body including a tank supported on said chassis, said tank body at its rear being provided with an opening, dispensing means for said tank body accessible through said opening, a movable panel forming a part of said tank body for said opening for enclosing said means, said panel being provided with a bumper, and bumper means transversely disposed in respect to said tank vehicle and forming a continuation of said panel bumper.

ROBERT W. CROSSEN, Jr.
HAROLD SOMERVELL.